(12) United States Patent
May et al.

(10) Patent No.: US 11,808,177 B1
(45) Date of Patent: Nov. 7, 2023

(54) RECESSED COMPRESSOR WHEEL FOR TURBOCHARGER OIL LEAKAGE MITIGATION

(71) Applicant: GM GLOBAL TECHNOLOGY OPERATIONS LLC, Detroit, MI (US)

(72) Inventors: Ian Alexander May, Rochester Hills, MI (US); Chijou Wang, Farmington Hills, MI (US); Carnell E. Williams, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/873,347

(22) Filed: Jul. 26, 2022

(51) Int. Cl.
*F01D 9/04* (2006.01)
*F01D 11/00* (2006.01)
*F01D 17/14* (2006.01)
*F02C 6/12* (2006.01)

(52) U.S. Cl.
CPC ............ *F01D 9/045* (2013.01); *F01D 11/005* (2013.01); *F01D 17/145* (2013.01); *F02C 6/12* (2013.01); *F05D 2220/40* (2013.01); *F05D 2240/128* (2013.01); *F05D 2260/60* (2013.01)

(58) Field of Classification Search
CPC ...... F01D 9/045; F01D 11/005; F01D 17/145; F02C 6/12; F05D 2220/40; F05D 2240/128; F05D 2260/60
See application file for complete search history.

(56) References Cited

U.S. PATENT DOCUMENTS

| | | | |
|---|---|---|---|
| 2009/0028723 A1* | 1/2009 | Wallis | F04B 49/225 417/295 |
| 2012/0003081 A1* | 1/2012 | Woollenweber | F01D 5/082 415/180 |
| 2019/0178105 A1* | 6/2019 | Race | F02C 6/12 |

* cited by examiner

*Primary Examiner* — Audrey B. Walter

(57) ABSTRACT

A turbocharger including a compressor section having a compressor housing with an air inlet and a compressor air discharge and a compressor wheel in the compressor housing. A turbine section having a turbine housing with an exhaust gas inlet and a turbine exhaust gas outlet and a turbine wheel in the turbine housing, the turbine wheel being drivingly connected to the compressor wheel, the exhaust gas inlet being configured to be connected to an engine exhaust passage and the turbine exhaust gas outlet being configured to be connected to an exhaust system. The compressor housing includes a diffuser with a recess that receives the compressor wheel wherein the recess has a sidewall with an upper edge and the compressor wheel has a base plate with an upper surface that is below the upper edge of the sidewall of the recess in the diffuser.

6 Claims, 2 Drawing Sheets

RECESSED COMPRESSOR WHEEL FOR TURBOCHARGER OIL LEAKAGE MITIGATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a turbocharger and more particularly to a turbocharger having a recessed compressor wheel for oil leakage mitigation.

A pre-compressor throttle is used on engines to mitigate charge air cooler icing and enable fuel tank purge for large gasoline tanks. The usage of this pre-compressor throttle results in a vacuum exerted on the compressor side of the ring seal between the turbocharger compressor housing and the bearing housing, causing oil leakage from the bearing housing into the compressor housing.

The design of a standard turbocharger has the compressor wheel flush with the diffuser edge/geometry of the compressor backplate, resulting in an ambient or higher air pressure behind the compressor wheel that increases with turbocharger speed. This causes gases blowing by the compressor ring seals to move from the compressor housing into the bearing housing and into the engine crankcase. However, the vacuum generated by the pre-compressor throttle imposes a lower than crankcase pressure behind the compressor wheel, particularly at low compressor wheel speeds where the pressure generated by the wheel is not large enough to negate the vacuum produced by the pre-compressor throttle. If the air pressure behind the compressor wheel is lower than the bearing housing (i.e., engine crankcase) pressure, engine oil will leak past the compressor seals into the compressor housing, ultimately being ingested by the engine or leaking out of the charge air cooler ducting.

SUMMARY

The present disclosure is directed to a turbocharger including a compressor section having a compressor housing with an air inlet and a compressor air discharge and a compressor wheel in the compressor housing. A turbine section includes a turbine housing with an exhaust gas inlet and a turbine exhaust gas outlet and a turbine wheel in the turbine housing. The turbine wheel is drivingly connected to the compressor wheel. The exhaust gas inlet is configured to be connected to an engine exhaust passage and the turbine exhaust gas outlet is configured to be connected to an exhaust system. The compressor housing includes a diffuser with a recess that receives the compressor wheel wherein the recess has a sidewall with an upper edge and the compressor wheel has a base plate with an upper surface that is below the upper edge of the sidewall of the recess in the diffuser.

Recessing the compressor wheel into the compressor backplate utilizes the boost pressure generated by the compressor wheel to raise the pressure on the compressor side of the ring seal, mitigating oil leakage. A particular geometry near the diffuser reduces wheel recess height required.

It is the novel shape of the compressor backplate and its interaction with the compressor wheel that is optimized to maximize the pressure behind the compressor wheel whilst minimizing the impact to compressor efficiency. The check valve aspect of the design is also unique in that it would limit the maximum pressure behind the compressor wheel to prevent any overloading of the turbocharger thrust bearing.

According to a further aspect, a pressure release passage is in communication with the recess in the diffuser.

According to yet another aspect, the pressure release passage includes a check valve. The check valve can be used to limit the maximum pressure that would be generated behind the wheel to alleviate the overloading risk to the turbocharger thrust bearing.

According to still another aspect, the turbine wheel is drivingly connected to the compressor wheel by a shaft.

According to a further aspect, a compressor backplate is disposed in the recess in the diffuser and opposing the base plate of the compressor wheel.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
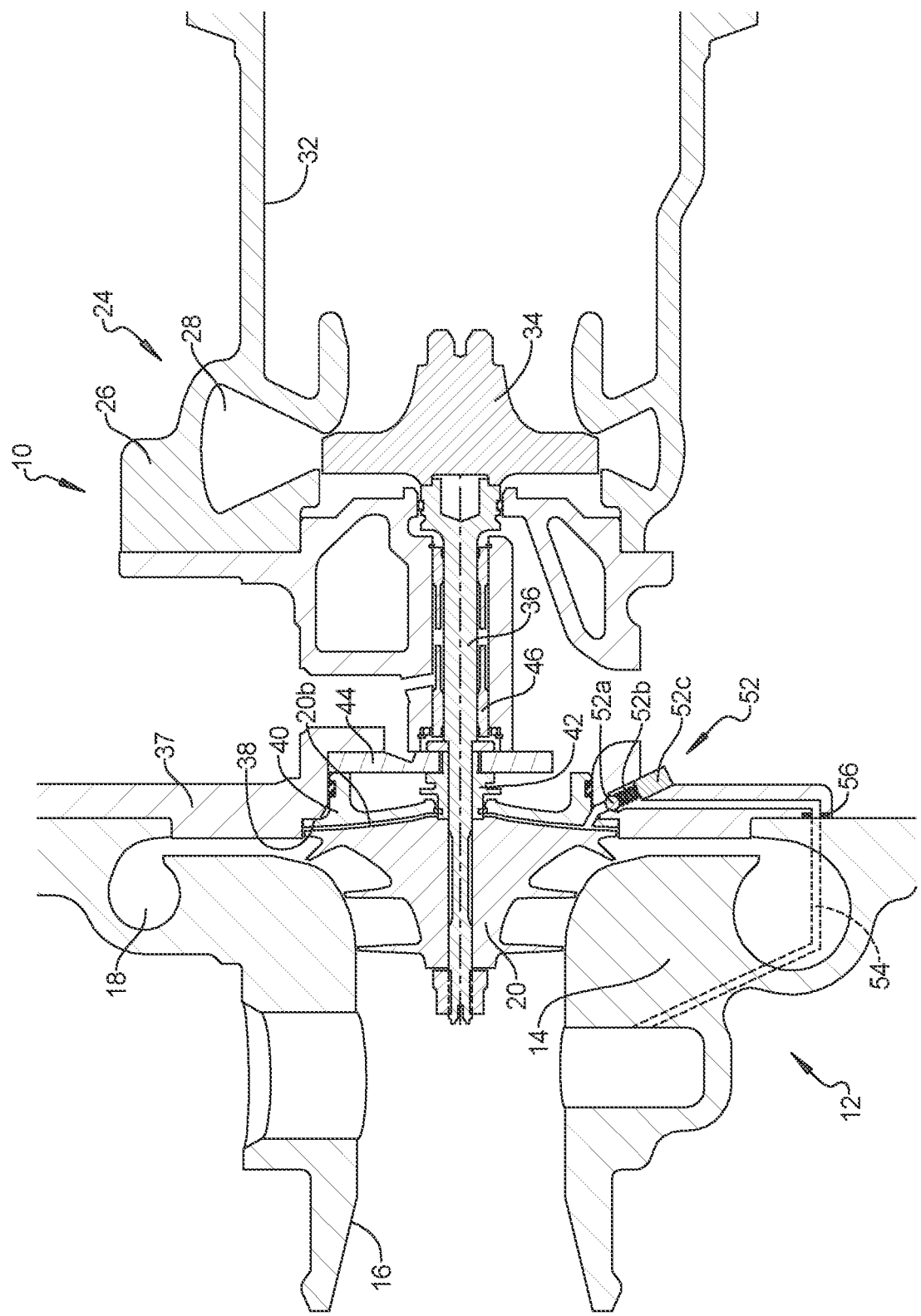
FIG. 1 is a cross-sectional view of a turbocharger according to the principles of the present disclosure.

With reference to FIG. 1, a turbocharger 10 includes a compressor section 12 having a compressor housing 14 with an air inlet 16 and a compressor air discharge 18 configured to communicate with an inlet manifold of an engine. A compressor wheel 20 is in the compressor housing 14. A turbine section 24 includes a turbine housing 26 with an exhaust gas inlet 28 connected to an exhaust outlet of an engine exhaust manifold and a turbine exhaust gas outlet that is configured to be connected to a vehicle exhaust system. A turbine wheel 34 is in the turbine housing 26 and is drivingly connected to the compressor wheel 20 by a turbocharger shaft 36. In operation, the exhaust gas inlet 28 of the turbine section 24 receives engine exhaust gas that drives the turbine wheel 34. The turbine wheel 34 drives the turbocharger shaft 36 and the compressor wheel 20 that compresses inlet air that is then delivered to the inlet manifold of the engine.

Figure 2:
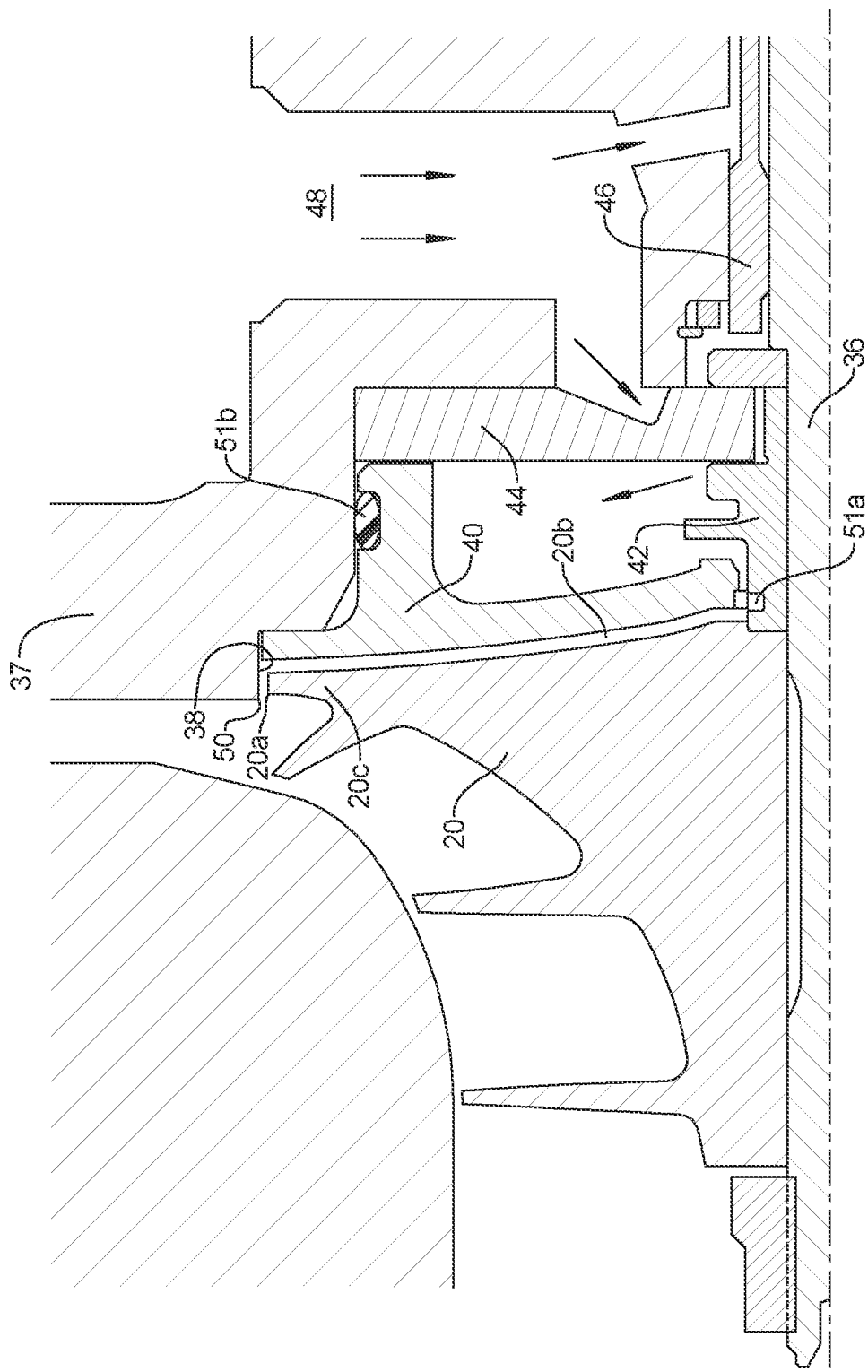
FIG. 2 is a detailed cross-sectional view of the compressor section of the turbocharger shown in FIG. 1.

With reference to FIG. 2, the compressor housing 14 includes a diffuser 37 with a recess 38 that receives the compressor wheel 20. The compressor wheel 20 is disposed against a compressor backplate 40. The compressor backplate 40 is disposed around a flinger 42 which is disposed against a thrust bearing 44. The turbocharger shaft 36 is connected to the compressor wheel 20 and to the flinger 42 and is rotatably supported by journal bearings 46. In the embodiment shown, lubricating oil is supplied through an oil passage 48 that lubricates the journal bearing 46 and the thrust bearing 44.

According to the present disclosure, the recess 38 in the diffuser 37 includes an upper edge 50. By the term "upper" it is meant that the compressor wheel 20 has a backplate 20c with an upper surface 20a that is recessed relative to the upper edge 50 and the compressor wheel 20 has a conical convex surface 20b that is received in a concave conical recess of the compressor backplate 40. The compressor section 12 utilizes the boost pressure generated by the compressor wheel to raise the back pressure on the compressor side of the ring seals 51a, 51b, mitigating oil leakage.

A one-way check valve 52 and pressure release passage 54 can be used to limit the maximum pressure that would be generated behind the compressor wheel 20 to alleviate an overloading risk to the turbocharger thrust bearing 44. The check valve 52 can include a ball 52a, a spring 52b and a threaded retainer 52c. Alternatively, other forms of check valves can be used such as, but not limited to a reed valve, a duck bill valve. An O-ring seal 56 can seal the passage 54 between the compressor housing 14 and the diffuser 37.

It is the recessed surface 20a of the compressor wheel 20 and its interaction with the relatively higher diffuser edge 50 that is optimized to maximize the pressure behind the compressor wheel 20 while minimizing the impact to compressor efficiency. The check valve 52 is also unique in that it limits the maximum pressure behind the compressor wheel 20 to prevent any overloading of the turbocharger thrust bearing.

The turbocharger of the present disclosure reduces the oil leakage via the turbocharger compressor ring seal when using the engine's pre-compressor throttle. The unique geometry of the compressor backplate in conjunction with recessing the compressor wheel enables a more favorable pressure differential across the compressor seal, while the check valve can limit the maximum pressure behind the wheel during higher turbocharger speed operation, thereby limiting the turbocharger thrust bearing load requirements.

Recessing the compressor wheel into the compressor backplate makes the air flow generated by the wheel more likely to hit the edge of the compressor backplate. The sharp edge of the unique geometry of the pocket increases the effectiveness of this and the combination of these will redirect a portion of the pressurized air behind the wheel. This causes a more favorable pressure differential across the compressor ring seal compared to a standard design and helps to reduce oil leakage into the engine. These features are passive and at high compressor wheel speeds, large amounts of air would be redirected behind the compressor wheel, raising the pressure beyond what a standard turbocharger bearing would be designed for. Under this scenario, the check valve 52 connecting the volume behind the compressor wheel 20 will be activated by the high differential pressure (pressure pushes valve open), allowing some of the pressure to be bled off before damaging the bearing 44.

The recessed compressor wheel design enables a larger operating zone for the pre-compressor throttle concept during purge. A broader operating range enables more purge volume which allows for a larger fuel tank to be used in the vehicle. Limiting oil leakage and subsequent consumption by the engine is also beneficial to the exhaust aftertreatment system and reduces likelihood for pre-ignition or smoke out the exhaust. It also reduces overall oil consumption for the engine.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A turbocharger comprising:
   a compressor section having a compressor housing with an air inlet and a compressor air discharge and a compressor wheel in the compressor housing;
   a turbine section having a turbine housing with an exhaust gas inlet and a turbine exhaust gas outlet and a turbine wheel in the turbine housing, the turbine wheel being drivingly connected to the compressor wheel, the turbine wheel and the compressor wheel are rotatable about an axis of rotation, the exhaust gas inlet being configured to be connected to an engine exhaust passage and the turbine exhaust gas outlet being configured to be connected to an exhaust system;
   wherein the compressor housing includes a diffuser with a recess that receives the compressor wheel wherein the recess has a sidewall with an upper edge and the compressor wheel has a base plate with an upper surface that is below the upper edge of the sidewall of the recess in the diffuser in an axial direction along the axis of rotation;
   a compressor backplate in the recess in the diffuser and opposing the base plate of the compressor wheel; and
   a pressure release passage in the compressor backplate, wherein the pressure release passage further extends through the diffuser.

2. The turbocharger according to claim 1, further comprising a seal between the compressor backplate and the diffuser.

3. The turbocharger according to claim 1, wherein the pressure release passage includes a check valve.

4. The turbocharger according to claim 3, wherein the check valve includes a ball and spring check valve.

5. A turbocharger comprising:
   a compressor section having a compressor housing with an air inlet and a compressor air discharge and a compressor wheel in the compressor housing, the compressor housing including a diffuser with a recess that receives the compressor wheel and a compressor backplate disposed in the recess in the diffuser and opposing a base plate of the compressor wheel, the compressor backplate including a pressure release passage including a check valve;

a turbine section having a turbine housing with an exhaust gas inlet and a turbine exhaust gas outlet and a turbine wheel in the turbine housing, the turbine wheel being drivingly connected to the compressor wheel, the turbine wheel and the compressor wheel are rotatable about an axis of rotation, the exhaust gas inlet being configured to be connected to an engine exhaust passage and the turbine exhaust gas outlet being configured to be connected to an exhaust system;

wherein the recess in the diffuser includes a sidewall with an upper edge and the base plate of the compressor wheel has an upper surface that is below the upper edge of the sidewall of the recess in the diffuser in an axial direction along the axis of rotation;

wherein the pressure release passage further extends through the diffuser.

6. The turbocharger according to claim 5, wherein the check valve includes a ball and spring check valve.

* * * * *